3,065,194
METHOD OF PREPARING SILICONE RUBBER
COMPOSITIONS
Siegfried Nitzsche and Manfred Wick, Burghausen, Germany, assignors to Wacker-Chemie G.m.b.H., Munich, Bavaria, Germany
No Drawing. Filed July 13, 1960, Ser. No. 42,494
Claims priority, application Germany July 16, 1959
3 Claims. (Cl. 260—37)

This invention relates to a method for preparing silicone rubber stocks capable of vulcanizing at room temperature.

Silicone rubbers are well-known materials and enjoy an expanding market in the field of elastomers. A recent development in silicone rubbers is the discovery and exploitation of room temperature vulcanizing silicone rubber stocks often designated "R.T.V." stocks. The RTV stocks offer unique commercial possibilities but to date these stocks require separate packaging as two component systems.

In general, the RTV stocks comprise (1) an essentially linear hydroxyl endblocked diorganosiloxane polymer with or without a filler and as a vulcanizing or cross linking system, (2) a cross linking agent, and (3) cross linking catalyst. The stock is prepared by mixing the enumerated ingredients. As soon as the mixing begins the stock begins to vulcanize. The immediate and relatively rapid vulcanization noted above is a desirable property on the one hand but it requires immediate processing and use of the stock. The processing time which is the time elapsing between incorporation of the cross linking agent and cross linking catalyst and the elastic solidification, so that the mass is plastic and workable only during this time, is generally quite short for RTV silicone rubber stocks. After the processing time has elapsed any unused stock is virtually lost and any stock partially worked may be lost because it becomes difficult or impossible to further work the stock after it has vulcanized. Thus, exact planning for processing circumstances and quantities has been required or the resulting expense of using RTV silicone rubber stocks has been unduly high because of resultant waste material.

To date the art has suggested extreme cooling and the use of solvents to prolong processing time. However, it is apparent that cooling cannot be practical in a wide variety of applications and the use of solvent brings about excessive shrinkage during the vulcanization. Processing time remains a distinct problem in the RTV silicone rubber art.

Furthermore, the RTV silicone rubber systems heretofore employed and described above have required packaging, shipment and storage in separate containers. In other words, they were two component systems requiring mixing before ultimate use. It is apparent the two component system presents difficulties for small quantity use of the RTV silicone rubber stocks. A single component system which could be packaged, shipped and stored in a single jar, tube or other container and used without further processing offers multiple advantages.

It is an object of this invention to introduce a novel RTV silicone rubber stock having extended processing time. A one component RTV stock is another object of this invention. A further object is an RTV silicone rubber stock which can be employed simply, with a minimum of equipment to produce excellent elastomers. Further objects and advantages of this invention are detailed in or will be apparent from the disclosure and claims following.

This invention comprises an essentially water free mixture of essentially anhydrous organopolysiloxanes of the average molecular formula $XOR_2SiO(R_2SiO)_nSiR_2OX$ where each R is a monovalent hydrocarbon radical or a halogenated monovalent hydrocarbon radial, each X is a hydrogen atom, alkyl radical or aryl radical, and $n$ is at least 50, an essentially anhydrous filler, an essentially anhydrous cross linking agent and an essentially anhydrous catalyst.

All of the components in the mixture are carefully dried before preparing the silicone rubber stock. The organosiloxane polymer and filler can be mixed and dried before addition of the predried cross linking agent and catalyst. Drying can be accomplished by any desired means. Heating the components to the 100° to 200° C. range or drying under vacuum employing a dessicant are suggested methods for accomplishing the required drying.

The starting components employed herein are disclosed in application Serial No. 602,081, filed August 3, 1956 but the components described in said application were not anhydrous or dried. The mixtures described and claimed in said application required the presence of water. The quantities of water required were very small ranging from .1% to .001% of the mixture on a weight basis and the water generally was incorporated into the silicone rubber stocks along with fillers, cross linking agent or catalyst. Thus the prior art disclosed water-containing silicone rubber stocks capable of room temperature vulcanization when mixed and requiring the presence of the water to achieve the desired vulcanization.

According ot this invention, all of the ingredients are vigorously dried prior to mixing. The polymers employed are essentially linear polymers having an average of 1.99 to 2.01 organic radicals per silicon atom. These polymers are generally defined by the formula $$XOR_2SiO[R_2SiO]_nSiR_2OX$$

where each X is a hydrogen atom, an alkyl radical or an aryl radical, preferably a hydrogen atom, each R is a monovalent hydrocarbon radical such as alkyl, aryl, alkenyl, alkaryl, aralkyl or cycloaliphatic, or a halogenated monovalent hydrocarbon radical such as chloro-, bromo- or fluoroalkyl, aryl or alkenyl, and $n$ has an average value of 50 or more. The operative polymers vary from relatively low viscosity fluids to high polymeric gums soluble in organic solvents. Although the operative polymers are essentially linear, minor amounts of monoorganosiloxane units ($RSiO_{3/2}$ units) can be tolerated and although the polymers are generally endblocked with terminal —OX groups, minor amounts of $R_3SiO_{1/2}$ units may be present. The operable siloxane polymers can be homopolymers such as hydroxy endblocked dimethylsiloxane, copolymers such as hydroxy and alkoxy endblocked dimethylphenylmethylsiloxane copolymers or mixtures of homopolymers and/or copolymers. Specific organic radicals represented by R can be illustrated by methyl, ethyl, monyl, octadecyl, phenyl, diphenyl, anthracyl, tolyl, xylyl, ethylphenyl, methylnaphthyl, benzyl, phenylethyl, cyclopropyl, cyclobutyl, cyclohexenyl, vinyl, allyl and octadecenyl as well as halogen substituted derivatives of such radicals including chloromethyl, bromomethyl, fluoromethyl, perchloroethyl, chlorofluoroethyl, bromophenyl, 3,3,3 - trifluoropropyl, α,α,α-trichlorotolyl, chlorobenzyl, perfluorocyclopropyl, chlorodifluorovinyl and chloroallyl.

The cross linking agents employed herein are polyfunctional organosilicon compounds containing an average of more than two functional groups per silicon atom in the molecules. The cross linking agents can be represented by the formula $$R_mSiZ_xO_{\frac{4-m-x}{2}}$$

where R is as above defined, each Z is a reactive group capable of reaction with the XO— substituents in the siloxane such as hydroxyl, alkoxyl, aryloxyl and amino radicals, $m$ has an average value from 0 to less than 2, $x$ has an average value exceeding 2 and $m+x$ has an average value greater than 2 and not exceeding 4. Particularly useful are orthosilicates such as $(CH_3O)_4Si$, $(C_2H_5O)_4Si$ and $(C_4H_9O)_4Si$; polysilicates such as hexaisopropoxydisiloxane, ethylpolysilicates and propylpolysilicates; alkyltrialkoxysilanes such as $CH_3Si(OC_2H_5)_3$ and $C_2H_5Si(OCH_3)_3$; aryltrialkoxysilanes such as phenyltributoxysilane; other ortho esters of silicic acid such as silicic acid ortho esters of glycols and relatively low molecular weight di-, tri-, tetra- and polysiloxanes prepared by partial hydrolysis and condensation of the silanes $RSiX_3$ such as dimethyltetraethoxydisiloxane and dimethyldiphenylhexaethoxytetrasiloxane.

The cross linking catalysts employed herein are metal salts, metal chelates, organometallic compounds, organic acids and organic bases. The extension of processing time appears to be particularly great with the use of metal compounds. Suitable metal compounds are metallic salts of organic monocarboxylic acids as exemplified by metal salts of resinates, linoleates, stearates, oleates, acetates, butyrates, octoates, naphthenates, ricinoleates and so forth, wherein the metallic ion is lead, tin, zirconium, antimony, iron, cadmium, barium, calcium, titanium, bismuth, manganese, zinc, chromium, cobalt or nickel. The operative salts include those salts which contain hydrocarbon radicals bonded to the metal atoms or ions. Specific examples of operable metal salts are dibutyl tin diacetate dibutyl tin dibenzoate, dibutyl tin adipate, lead octoate, tin ricinoleate, aluminum acetyl acetonate, dioctyl tin monoacetate and dialkyl tin acylates generally. Operable organic acids include acetic acid and oleic acid. Operable organic bases include secondary amines such as dibutylamine as well as triethanolamine and polyethyleneimine.

In addition to the required ingredients noted above the silicone rubber stocks can contain fillers, pigments, compression-set and elongation-set additives, oxidation inhibitors, plasticizers and other known additives employed in silicone rubber stocks. Of particular interest are the fillers such as natural and manufactured silicas including diatomaceous earth, quartz dust, fume silicas, silica aerogels and silica xerogels, $TiO_2$, lithopone, zinc oxide, zirconium silicate, iron oxide, calcium carbonate, glass fibers and other fillers known and used in silicone rubber stocks. Particularly good results are achieved employing fillers which tend to chemically bind water such as calcined gypsum.

The operative proportions of the ingredients employed herein vary widely depending upon ultimate use, characteristics desired in the ultimate rubber, handling requirements, process requirements and so forth. In general acceptable results are achieved with 100 parts by weight siloxane polymer, 0.1 to 50 parts by weight of cross linking agent and 0.01 to 10 parts by weight of vulcanization or cross linking catalyst with up to 300 parts by weight of filler, if desired, and other additives in standard quantities varying from .01 to 10 parts by weight.

The RTV silicone rubber stock is prepared by carefully drying the ingredients and mixing under anhydrous atmosphere in any desired order. The polymer, cross linking agent, cross linking catalyst, filler, if any, and other additives can be mixed by any desired method maintaining essentially anhydrous conditions. Anhydrous organic solvents can be used to facilitate mixing and the mixture can be stored in organic solvent solution and used from solution if desired.

These materials are ready for use and can be exposed and employed over a long period of time so long as they are kept essentially water free. Exposure to atmospheric moisture, drenching the completed article with water, stirring water into the mixture, painting, flowing, or spraying water over the finished article are suggested methods for effectuating the vulcanization of these materials. The required operation is merely to bring the material into contact with water or water vapor thus setting off the reaction which brings about the desired vulcanization and this operation can be effected in any desired manner.

The materials obtained according to this invention can be packaged, stored and shipped in a single container and the user can use the material without further processing of any kind. These materials are useful as sealants, electrical insulation, coatings, dental cement, caulking compounds, expansion joints, gaskets, shock absorbers, adhesives and a host of obvious uses not enumerated.

The following examples are included herein to aid those skilled in the art in understanding and practicing the invention. All parts and percentages in the examples are based on weight and all viscosities were measured at 25° C. The scope of the invention is defined by the claims and is not restricted by the examples.

*Example 1*

Silicone rubber stock A was prepared by mixing 100 parts of an essentially water free hydroxyl endblocked dimethylsiloxane polymer of 16,500 cs., 50 parts quartz flour which had been predried by heating 1 hour at 200° C., and a mixture of 0.5 part ethylorthosilicate and 0.2 part dibutyl tin dilaurate, both predried over glowing sodium sulfate, was added. The stock A was filled into a tube. A control stock B was prepared identically to the above but employing standard undried quartz flour and undried ethylorthosilicate and dibutyl tin dilaurate and was filled into a tube. The control stock B had a processing time of less than 2 hours, and was highly elastic after only 5 hours storage at room temperature. By way of contrast, the essentially anhydrous stock A in accordance with this invention remained fluid after 14 days of storage and had a processing time of about 5 hours at room temperature after 14 days storage in the tube. A 5 mm. layer from the tube after 14 days storage could be vulcanized at room temperature within 25 minutes by drenching the layer with water.

*Example 2*

Silicone rubber stock C was prepared with 100 parts of hydroxyl endblocked dimethylsiloxane polymer of 32,000 cs. viscosity, 50 parts gypsum, 0.5 part methyltrimethoxysilane and 0.3 part lead ricinoleate on a three-roll mill under atmospheric moisture conditions. The resulting stock C had a processing time of 10 hours and was fully vulcanized after 20 hours at room temperature. An identical stock D prepared in accordance with this invention with predried polymer, gypsum heated to drive off substantially all water, and predried cross linking agent and catalyst was stored in a container with screw lid closure and rubber sealing. After three weeks of storage the stock D remained fluid and plastic. Upon removing the lid, vulcanization proceeds almost immediately as evidenced by formation of a surface skin on the mixture. The stock D was dissolved in toluene to give a 50% solution and the solution was employed as a paint. The solution air-dried under atmospheric moisture in a few hours.

*Example 3*

Equivalent stocks were obtained when 100 parts of each of the following siloxane polymers were substituted for the dimethylsiloxane in mixture D employing the method of Example 2: (E) 50,000 cs. hydroxyl endblocked 3,3,3-trifluoropropylmethylsiloxane; (F) 100,000 cs. hydroxyl endblocked copolymer of 85 mol percent dimethylsiloxane, 14.8 mol percent phenylmethylsiloxane, and 0.2 mol percent methylvinylsiloxane; (G) 30,000 cs. methoxy endblocked copolymer of 50 mol percent methylphenylsiloxane and 50 mol percent methylethylsiloxane; and (H) an equimolar mixture of 30,000 cs. hydroxy endblocked dimethylsiloxane and 50,000 cs. ethoxy endblocked 3,3,3-trifluoropropylmethylsiloxane.

*Example 4*

Equivalent stocks were obtained when the following cross linking agents in the amounts specified were substituted for the 0.5 part ethylorthosilicate in silicone rubber stock A: 2.0 parts ethylpolysilicate; 3.0 parts ethyltrimethoxysilane; 4.0 parts dimethyltetraethoxydisiloxane; 1.5 parts $C_2H_5O[CH_3Si(OC_2H_5)O]_5C_2H_5$; and 1.5 parts propylpolysilicate.

*Example 5*

Equivalent stocks were obtaind when the following cross linking or vulcanizing catalysts were employed in place of the 0.2 part dibutyl tin dilaurate in silicone rubber stock A in Example 1: 2.0 parts lead naphthanate; 1.5 parts zironium oleate; 2.5 parts barium acetate; 5 parts antimony octoate; 1.5 parts ferric stearate; 6.0 parts cadmium butyrate; 1 part barium linoleate; .2 part calcium octoate; .5 part titanium naphthanate; 2 parts manganese resinate; .5 part zinc octoate; .5 part chromium octoate; .5 part cobalt octoate and 0.5 part nickel stearate as well as 1 part of dibutyl tin diacetate, dibutyl tindibenzoate, acetic acid, oleic acid, dibutylamine, triethanolamine or polyethyleneimine.

*Example 6*

When the following stock K was prepared it was found to be storeable in the absence of moisture and vulcanizable in the presence of moisture: 100 parts essentially water free hydroxy endblocked dimethylsiloxane polymer of 50,000 cs. and a mixture of 0.2 part dibutyl tin dilaurate and 0.5 part ethyl orthosilicate dried as in Example 1.

*Example 7*

When the following fillers were carefully predried and employed in place of the 50 parts quartz flour in Stock A, Example 1, equivalent stocks were obtained: 35 parts fume silica; 100 parts diatomaceous earth; 50 parts titanium dioxide; 20 parts calcium carbonate; 75 parts glass fibers; and 80 parts silica aerogel.

That which is claimed is:

1. A silicone rubber stock capable of vulcanizing at room temperature under the influence of water and water vapor consisting essentially of a mixture of (A) 100 parts by weight of an essentially water-free organosiloxane polymer of the average molecular formula $$XOR_2SiO(R_2SiO)_nSiR_2OX$$

where each R is a radical selected from the group consisting of monovalent hydrocarbon radicals and halogenated monovalent hydrocarbon radicals, each X is selected from the group consisting of hydrogen atom, alkyl radicals and aryl radicals and $n$ is at least 50, (B) 0.1 to 50 parts by weight of an essentially anhydrous cross linking agent of the unit formula $$R_mSiZ_xO_{\frac{4-m-x}{2}}$$

where R is as above defined, each Z is a reactive substituent selected from the group consisting of hydroxyl radicals, alkoxyl radicals, aryloxyl radicals and amino radicals, $m$ has an average value from 0 to less than 2, $x$ has an average value exceeding 2, and $m+x$ has an average value greater than 2 and not exceeding 4, and (C) .01 to 10 parts by weight of an essentially anhydrous cross linking catalyst selected from the group consisting of (1) metallic salts of organic monocarboxylic acids wherein the metals are selected from the group consisting of lead, tin, zirconium, antimony, iron, cadmium, barium, calcium, titanium, bismuth, manganese, zinc, chromium, cobalt and nickel; (2) acetic acid and oleic acid, (3) secondary amines and (4) chromium acetyl acetonate.

2. The mixture of claim 1 further characterized in that it also contains (D) up to 300 parts by weight of an inorganic filler.

3. The mixture of claim 2 wherein the organosiloxane polymer (A) is an hydroxyl endblocked dimethylsiloxane, the cross linking agent (B) is an alkylsilicate, the cross linking catalyst (C) is a dialkyl tin diacylate and the filler (D) is calcined gypsum.

References Cited in the file of this patent

UNITED STATES PATENTS

| 2,843,555 | Berridge | July 15, 1958 |
| 2,927,907 | Polmanteer | Mar. 8, 1960 |

FOREIGN PATENTS

| 216,878 | Australia | Aug. 29, 1958 |
| 1,058,254 | Germany | May 27, 1959 |